United States Patent
Whalen et al.

(10) Patent No.: US 9,090,326 B2
(45) Date of Patent: Jul. 28, 2015

(54) ACTIVE FLOW CONTROL ON A VERTICAL STABILIZER AND RUDDER

(75) Inventors: Edward A. Whalen, St. Louis, MO (US); Mark I. Goldhammer, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 12/903,720

(22) Filed: Oct. 13, 2010

(65) Prior Publication Data

US 2012/0091266 A1 Apr. 19, 2012

(51) Int. Cl.
*B64C 5/06* (2006.01)
*B64C 9/00* (2006.01)
*F15D 1/00* (2006.01)
*B64C 21/00* (2006.01)
*B64C 23/00* (2006.01)
*B64C 23/06* (2006.01)

(52) U.S. Cl.
CPC . *B64C 5/06* (2013.01); *B64C 21/00* (2013.01); *B64C 23/005* (2013.01); *B64C 23/06* (2013.01); *B64C 2230/04* (2013.01); *B64C 2230/16* (2013.01); *Y02T 50/162* (2013.01); *Y02T 50/166* (2013.01)

(58) Field of Classification Search
CPC ....... Y02T 50/166; Y02T 50/12; Y02T 50/32; Y02T 50/673; Y02T 50/66; Y02T 50/164; Y02T 50/671; Y02T 50/162; Y02T 50/675; Y02T 50/34; Y02T 50/54; B64C 21/025; B64C 2230/04; B64C 21/08; B64C 21/04; B64C 21/06; B64C 2230/06

USPC .......... 244/76 C, 87, 199.1, 199.3, 201, 204, 244/204.1, 205, 208; 137/803, 833, 834
See application file for complete search history.

(56) References Cited

U.S. PATENT DOCUMENTS 2,387,526 A * 10/1945 Nagamatsu .................... 244/198
2,938,680 A * 5/1960 Greene et al. .................. 244/214
(Continued)

FOREIGN PATENT DOCUMENTS

JP 2009251027 A 10/2009

OTHER PUBLICATIONS

David F. Rogers, "Vortex Generator Flight Tests—Stall Effects", Fig. 3, 2002.*
(Continued)

*Primary Examiner* — Tien Dinh
*Assistant Examiner* — Assres H Woldemaryam
(74) *Attorney, Agent, or Firm* — Baldauff IP, LLC; Michael J. Baldauff, Jr.

(57) ABSTRACT

Systems and methods described herein provide for the control of airflow over a vertical control surface of an aircraft to enhance the forces produced by the surface. According to one aspect of the disclosure provided herein, the vertical control surface of the aircraft is engaged by active flow control actuators that interact with the ambient airflow to alter one or more characteristics of the airflow. An actuator control system detects a flow control event, and in response, activates the active flow control actuators to alter the airflow. According to various aspects, the flow control event is associated with a separation of the airflow, which is corrected through the activation of the appropriate active flow control actuators, increasing the forces produced by the vertical control surface of the aircraft.

17 Claims, 7 Drawing Sheets

(56) References Cited

U.S. PATENT DOCUMENTS

| | | | |
|---|---|---|---|
| 4,213,587 A * | 7/1980 | Roeseler et al. | 244/213 |
| 4,299,442 A | 11/1981 | Buckelew | |
| 4,395,007 A * | 7/1983 | Owl, Jr. | 244/215 |
| 4,633,376 A | 12/1986 | Newman | |
| 4,641,799 A * | 2/1987 | Quast et al. | 244/207 |
| 5,222,699 A * | 6/1993 | Albach et al. | 244/213 |
| 5,282,591 A * | 2/1994 | Walters et al. | 244/199.1 |
| 5,458,304 A | 10/1995 | Gilbert | |
| 5,806,805 A * | 9/1998 | Elbert et al. | 244/195 |
| 5,825,305 A | 10/1998 | Biferno | |
| 5,884,872 A * | 3/1999 | Greenhalgh | 244/201 |
| 5,899,416 A * | 5/1999 | Meister et al. | 244/207 |
| 5,983,944 A | 11/1999 | Niv | |
| 5,988,522 A * | 11/1999 | Glezer et al. | 239/11 |
| 6,412,732 B1 | 7/2002 | Amitay et al. | |
| 6,634,597 B2 * | 10/2003 | Johnson et al. | 244/118.5 |
| 6,644,598 B2 | 11/2003 | Glezer et al. | |
| 6,682,021 B1 | 1/2004 | Truax et al. | |
| 7,334,760 B1 | 2/2008 | Lisy et al. | |
| 7,537,182 B2 | 5/2009 | Greenblatt | |
| 7,600,714 B2 * | 10/2009 | Sheoran et al. | 244/53 B |
| 7,624,941 B1 | 12/2009 | Patel et al. | |
| 7,686,257 B2 * | 3/2010 | Saddoughi et al. | 244/204 |
| 7,913,949 B2 * | 3/2011 | Hoffenberg | 244/87 |
| 7,967,258 B2 * | 6/2011 | Smith et al. | 244/207 |
| 8,038,093 B2 * | 10/2011 | Llamas Sandin et al. | 244/87 |
| 8,070,106 B2 * | 12/2011 | Engelbrecht et al. | 244/215 |
| 2002/0018009 A1 | 2/2002 | Rast | |
| 2004/0129838 A1 | 7/2004 | Lisy et al. | |
| 2005/0116095 A1 * | 6/2005 | Cline et al. | 244/75 R |
| 2006/0273197 A1 * | 12/2006 | Saddoughi et al. | 239/265.17 |
| 2008/0302919 A1 | 12/2008 | Hoffenberg | |
| 2009/0308980 A1 * | 12/2009 | Miller et al. | 244/207 |
| 2010/0104436 A1 * | 4/2010 | Herr et al. | 416/31 |
| 2010/0302072 A1 | 12/2010 | Larcher | |
| 2012/0048995 A1 * | 3/2012 | Tanguy | 244/87 |

OTHER PUBLICATIONS

Greenblatt, et al, article entitled, "Influence of Finite Span and Sweep on Active Flow Control Efficacy," published in the AIAA Journal, vol. 46, No. 7, Jul. 2008; 20 pages.

European Extended Search Report dated Mar. 15, 2013 in EP Application No. 12171646.8-1560 / 2549329.

Extended European Search Report dated Apr. 11, 2014 from Application Serial No. 11183674.8.

Mabe, James, "Flipperons for Improved Aerodynamic Performance—Nasa Tech Briefs", Apr. 24, 2008, pp. 3-6—XP55111796A.

Mabe, James, "Flipperons for Improved Aerodynamic Performance—Nasa Tech Briefs", Apr. 24, 2008, pp. 3-6—XP55111803A.

* cited by examiner

ACTIVE FLOW CONTROL ON A VERTICAL STABILIZER AND RUDDER

BACKGROUND

Conventional commercial aircraft are designed with a vertical tail used to provide stability about the yaw axis. The vertical tail of an aircraft may include a fixed vertical stabilizer and a moveable rudder that is hinged at the trailing edge of the vertical stabilizer. During normal flight operations, the vertical tail provides a force that allows a pilot to properly align and maintain control of the aircraft. By deflecting the rudder, the pilot increases the force created by the vertical tail to provide a desired yawing moment on the aircraft. The size of the vertical tail is determined according to the designed flight envelope in which the aircraft will operate and the necessary forces to sustain controlled flight within the boundaries of that envelope. For example, during emergency situations such as an engine failure or extremely high cross winds, the force required to be produced by the vertical tail to maintain control of the aircraft may be at a maximum. During aircraft design, this force is calculated and the vertical tail is sized accordingly to ensure the capability of producing this force in the event that those emergency situations or flight operations at the boundaries of the desired flight envelope arise.

However, as the size of the vertical tail increases, the corresponding weight of the aircraft increases, as does the amount of drag generated by the vertical tail. As weight and drag increase, the cost of manufacturing and operating the resulting aircraft also increase. Even though the forces required by the vertical tail of an aircraft to maintain stability during normal flight operations would permit a decrease in the size of a conventional vertical tail, reducing the size of the vertical tail is not feasible due to the need to prepare for operations at the edges of the designed flight envelope.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Systems and methods described herein provide for an active flow control system for controlling an airflow over a vertical control surface of an aircraft. Utilizing the concepts described herein, the forces created by the vertical tail of an aircraft can be selectively enhanced and allow the size and corresponding weight of the vertical tail to be significantly reduced as compared to a conventional aircraft tail while maintaining yaw control for the aircraft throughout the designed flight envelope.

According to one aspect of the disclosure provided herein, an active flow control system includes a vertical control surface, one or more active flow control actuators, and an actuator control system. The active flow control actuators are mounted on or within the vertical control surface and when activated, alter one or more characteristics of the airflow over the surface. The actuator control system detects a flow control event for which airflow actuation is desirable. In response to detecting the event, the actuator control system activates the flow control actuators to control the airflow.

According to another aspect, a method of controlling airflow over a vertical control surface of an aircraft includes detecting a flow control event associated with the surface. In response to detecting the flow control event, one or more active flow control actuators are activated. The active flow control actuators interact with the ambient airflow, altering the airflow as it passes over the vertical control surface.

According to yet another aspect, an active flow control system for controlling an airflow over a vertical control surface of an aircraft includes the vertical control surface, a number of active flow control actuators, and an actuator control system. The active flow control actuators are mounted within the vertical control surface within a number of zones. When activated, the active flow control actuators alter a flow characteristic of the airflow. The actuator control system is linked to the actuators and includes a number of sensors and a controller. The sensors collect data associated with a flow control event. The controller utilizes the collected data to detect the flow control event. After detecting the event, the controller identifies a subset of the total number of actuators for activation. The subset corresponds to a zone in which activation of the member actuators is effective in controlling the airflow in response to the flow control event. The controller activates the actuators within the identified zone or subset of actuators.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to systems and methods for controlling airflow around a vertical control surface of an aircraft to enhance the forces produced by the surface. As discussed briefly above, typical aircraft vertical tail surfaces are substantially larger than is necessary for normal flight operations. However, due to the need to maintain aircraft stability and control during operations at the outer boundaries of the designed flight envelope, conventional aircraft vertical stabilizers and corresponding rudders are sized accordingly, creating undesirable weight and drag penalties during flight.

However, utilizing the concepts and technologies described herein, active flow control actuation techniques are used to selectively enhance the ambient airflow characteristics over the vertical tail surfaces, and consequently increase the forces produced by the surfaces. In doing so, the relative size of the vertical tail surfaces may be substantially reduced, while maintaining the performance capabilities of a conventionally sized, unactuated aircraft vertical tail.

Figure 1B:
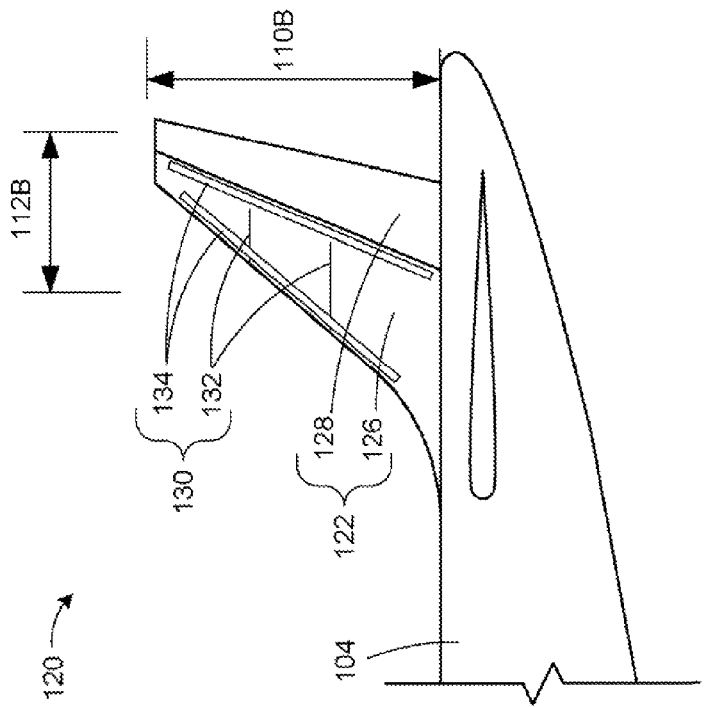
FIGS. 1A and 1B are side views of a conventional aircraft vertical tail and an enhanced flow control tail according to embodiments presented herein, respectively, showing a size comparison between the two vertical control surfaces.
Figure 1A:
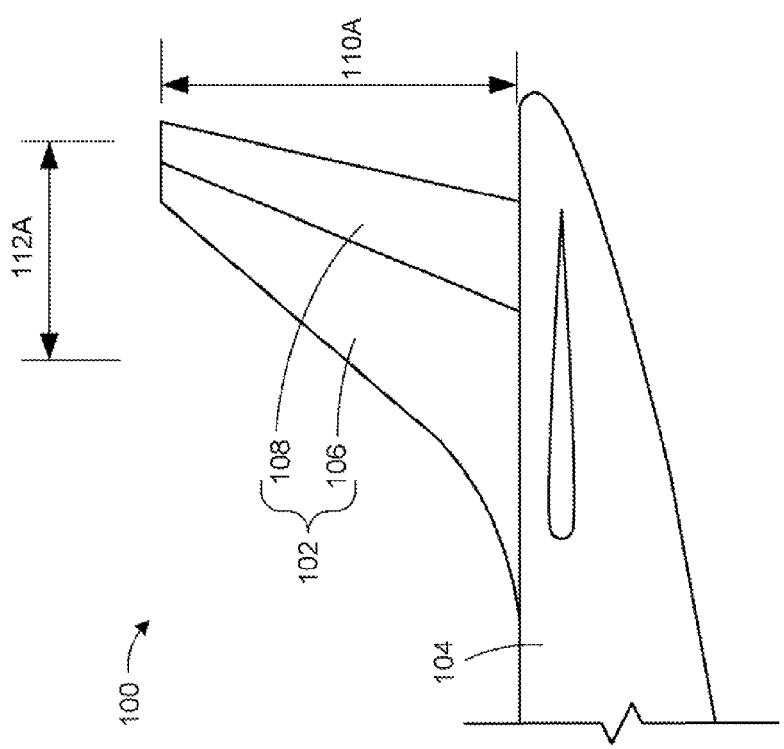

In the following detailed description, references are made to the accompanying drawings that form a part hereof, and which are shown by way of illustration, specific embodiments, or examples. Referring now to the drawings, in which like numerals represent like elements through the several figures, an active flow control system and method will be described. FIGS. 1A and 1B show a comparison between a conventional aircraft vertical tail 100 and an enhanced flow control tail 120 according to embodiments described herein. FIG. 1A shows an example of the conventional aircraft vertical tail 100. The conventional aircraft vertical tail 100 includes a vertical control surface 102 mounted to a rear fuselage portion 104.

According to various embodiments shown and described herein, the vertical control surface 102 includes a vertical stabilizer 106 and a rudder 108 that is attached to the vertical stabilizer 106 via a hinge and rotatable around the hinge to provide the appropriate yawing force according to a corresponding deflection angle. The size of the conventional vertical control surface 102 is illustrated with the dimensional arrows corresponding to a conventional span 110A and a conventional mean chord length 112A. It should be appreciated that the figures are not drawn to scale, but are approximated for illustrative purposes. The precise dimensions and configurations of the vertical tail components may vary according to the particular implementation. Moreover, it should be understood that the vertical control surface 102 is not limited to the exact configuration of the vertical stabilizer 106 and rudder 108 shown in the figures. Rather, the vertical control surface 102 may include any control surface configured to control aircraft yaw.

In comparison, FIG. 1B shows an example of an enhanced flow control tail 120 utilizing the concepts described herein. The enhanced flow control tail 120 includes a vertical control surface 122 mounted to the fuselage portion 104, which is identical to the fuselage portion 104 shown with the conventional aircraft vertical tail 100 shown in FIG. 1A. The vertical control surface 122 includes a vertical stabilizer 126 and a rudder 128 that is attached to the vertical stabilizer 126 via a hinge and rotatable around the hinge to provide the appropriate yawing force according to a corresponding deflection angle. A significant observable difference between the enhanced flow control tail 120 utilizing the technology described below and the conventional aircraft vertical tail 100 described above is the size. Although not drawn to scale, it can be seen in FIG. 1B that the span 110B of the vertical control surface 122 is shorter than the span 110A of the conventional vertical control surface 102. Similarly, the mean chord length 112B of the vertical control surface 122 is likewise shorter than the mean chord length 112A of the conventional vertical control surface 102.

In order to allow for the decreased surface area of the vertical control surface 122, various embodiments disclosed herein utilize an active flow control system 130. Among other components that will be described in greater detail below with respect to FIG. 6, the active flow control system 130 includes an actuator control system 132 and a number of active flow control actuators 134. Although the actuator control system 132 is depicted as two horizontal lines and the active flow control actuators as two lines positioned parallel to the leading edge and trailing edge of the vertical stabilizer 126, respectively, it should be understood that the depicted locations of these components on the vertical control surface 122 are shown for illustrative purposes only. It will become clear from FIGS. 2-4 and the corresponding descriptions that the locations and the components of the active flow control system 130 may vary according to the particular implementation.

Figure 2:
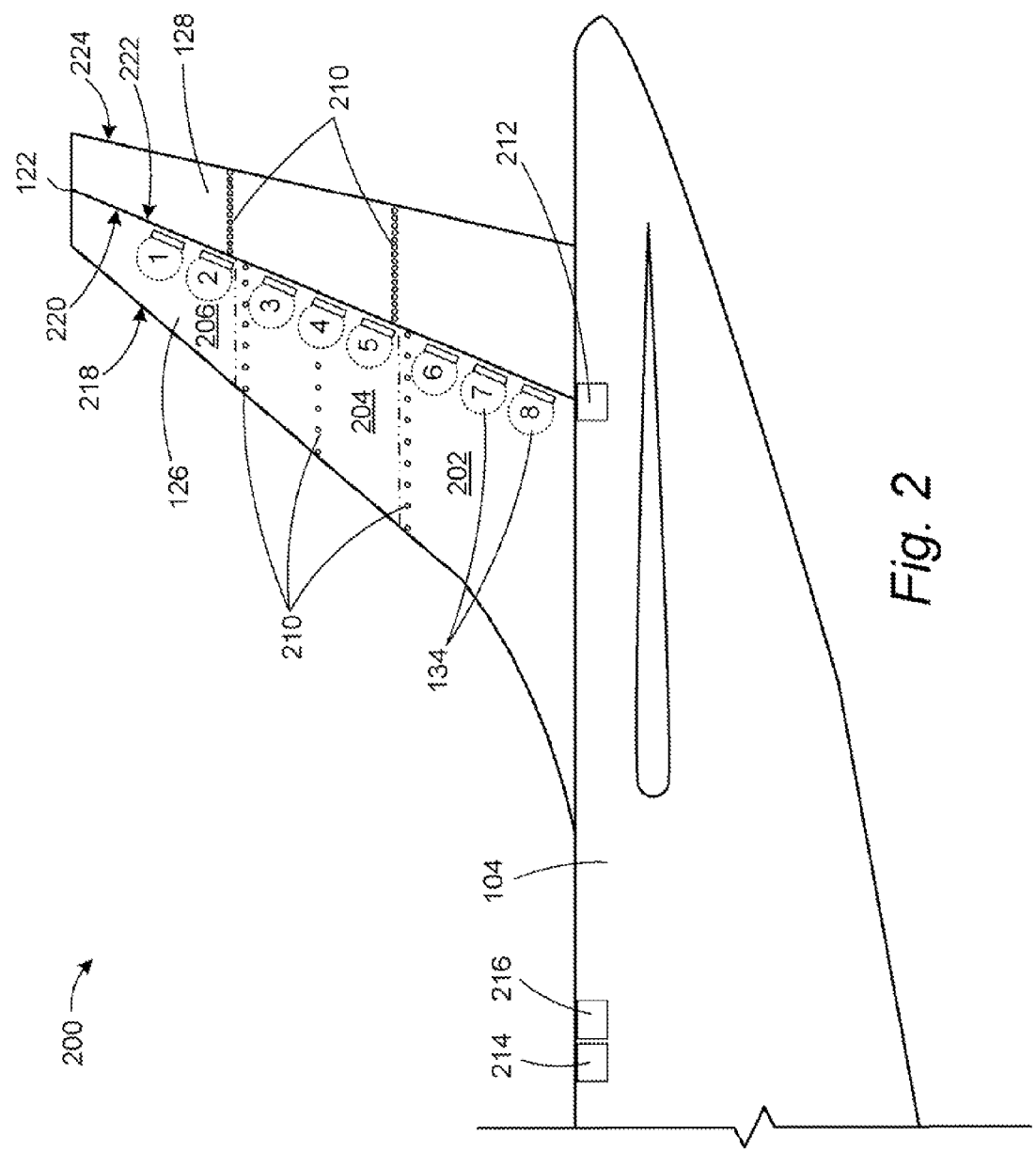
FIG. 2 is a side view of an enhanced flow control tail of an aircraft showing components of an active flow control system with active flow control actuators positioned at a trailing edge of a vertical stabilizer according to one embodiment presented herein.

Turning now to FIG. 2, an enhanced flow control tail 200 will be described according to one embodiment. The enhanced flow control tail 200 includes a vertical stabilizer 126 and an attached rudder 128. According to this implementation, a number of active flow control actuators 134 are mounted within the vertical stabilizer 126. While eight active flow control actuators 134 are shown in FIG. 2, any number of active flow control actuators 134 may be utilized within the scope of this disclosure. The precise number utilized might depend on the type of actuators used, the type of aircraft the actuators are used with, the placement of the actuators, and any other applicable design considerations.

The active flow control actuators 134 of this example are shown to be linearly aligned proximate to and parallel with the trailing edge 220 of the vertical stabilizer 126. A position that allows for the interaction of actuating air from the active flow control actuators 134 with the ambient airflow over the leading edge of the rudder 128 is an advantageous position for one or more of the active flow control actuators 134 since the deflection of the rudder 128 around the rudder hinge creates a pressure differential that may lead to undesirable flow separation, particularly as the deflection angle of the rudder increases. Control of this separation during the deflection of the rudder 128 increases the aerodynamic forces created by the vertical control surfaces of the aircraft, subsequently allowing for a smaller vertical tail without a detrimental effect on the boundaries of the flight envelope.

The active flow control actuators 134 may be any type of flow control actuators, including but not limited to synthetic jets, sweep jets, flipperons, active vortex generators, and/or any combination thereof. For example, piezoelectric disks may be utilized as active flow control actuators 134 to control the flow over the enhanced flow control tail 200. It should be clear that the shape and configuration of the active flow control actuators 134 shown in the figures is not intended to be limiting. Examples of active flow control actuators 134 that may be utilized within the various embodiments described herein include those described in co-pending U.S. patent application Ser. No. 12/236,032, entitled "Shaping a Fluid Cavity of a Flow Control Actuator for Creation of Desired Waveform Characteristics" and filed on Sep. 23, 2008, and U.S. patent application Ser. No. 12/696,529, entitled "Multi-Stage Flow Control Actuation" and filed on Jan. 29, 2010, each of which is incorporated by reference herein in its entirety. It should be appreciated that the active flow control actuators 134 may be activated electronically or pneumatically, or according to any desired method depending on the type of actuators used.

According to one embodiment, the active flow control actuators 134 may be configured within zones and utilized according to zone membership. By actuating the flow over the vertical control surface 122 according to zones, power can be managed and allocated to only those actuators necessary to control the airflow at that given moment. Because power management during flight operations is a significant consideration, minimizing the power consumption by the active flow control system 130 is a beneficial attribute of the zone-actuated flow control described herein with respect to various embodiments. Moreover, by minimizing the number of active flow control actuators 134 activated at a given time, wear on actuators and associated components of the active flow control system 130 is also minimized.

The various zones used to group the active flow control actuators 134 may be defined according to a physical location of the actuators along the vertical control surface 122. In the example shown in FIG. 2, there are three zones 202, 204, 206 sequentially arranged vertically from a root of the vertical control surface 122 abutting the aircraft fuselage 104 to a tip of the vertical control surface 122 opposite the root, the boundaries of which are depicted with broken lines. Tip zone 206 includes actuators 1 and 2, middle zone 204 includes actuators 3-5, and root zone 202 includes actuators 6-8. As an example of zone-actuated flow control, if the active flow control system 130 detected a flow separation condition proximate to the rudder hinge line at the leading edge 222 of the rudder 128 near the tip of the vertical control surface 122, then the actuators 1 and 2 that are members of the tip zone 206 might be activated while the remaining actuators 3-8 remain deactivated. Depending on the rudder deflection and other flight parameters corresponding the operations of the aircraft and the characteristics of the surrounding environment at the time of actuation, it may be beneficial to activate the active flow control actuators 134 according to differing zone sequences.

According to an alternative embodiment, the zones are not sequentially separated according to root, middle, and tip positioning as described above, but include various predetermined combinations of actuators. For example, a first zone might contain actuators 1, 3, and 6; a second zone including actuators 2, 4, and 7; and a third zone including actuators 4 and 8. In this scenario, the first zone might be activated first to provide some degree of flow actuation across the entire span of the vertical control surface 122. As further actuation is required, the second zone would be actuated, followed by the third as necessary.

It should be understood that the zones and corresponding actuator members may be defined in any suitable manner. According to yet another embodiment, the zones are dynamically defined during flight operations according to the particular flight parameters at the particular instance in which flow actuation is desired. For example, the active flow control system 130 may determine that actuators 1 and 2 should be activated to prevent flow separation at an outboard section of the rudder 128. At the next instant, due to a change in pilot input to the flight control system or to a change in cross-winds or other environmental factor, the system may determine that actuators 1, 4, and 6 are to be activated and actuator 2 deactivated. Generally, this embodiment allows for the selective activation of any subset of the total number of active flow control actuators 134 in response to the current conditions of the aircraft and/or the environment.

According to another implementation, in addition to or in combination with the above zone-actuated flow control techniques, the active flow control system 130 may control the output of the activated flow control actuators 134 by controlling the input power distributed to the actuators. For example, should only half of the output capability of a particular actuator be required to prevent or correct a flow separation at a particular location on the vertical control surface 122 given the current flight conditions, then the active flow control system 130 may reduce the input power accordingly to provide the reduced output actuating flow.

The activation of the active flow control actuators 134 occurs when triggered by the actuator control system 132. The actuator control system 132 includes an event detection system having one or more sensors that are capable of detecting a flow control event. For the purposes of this disclosure, a flow control event includes any condition or parameter with respect to the aircraft and/or the surrounding environment in which it travels, in which active flow control techniques described herein would be desirable.

One example of a flow control event is the detection of a flow separation indicator. A flow separation indicator may include any data that may represent that flow separation on the vertical control surface 122 is occurring, or that conditions are optimal for separation to occur. One example of a flow separation indicator would be the detection of a pressure gradient associated with the airflow indicative of an impending or current flow separation. Another flow separation indicator may include a rudder deflection beyond a threshold deflection angle. Other flow control events might include, but are not limited to, a pilot or flight system control input that is indicative of an increased yaw control demand, an engine out or other emergency state in which increased yaw control is necessary, and one or more flow control flight parameters corresponding to an aircraft operating state and/or an environmental state such as aircraft speed, altitude, sideslip angle, ambient airflow pressure, or any combination thereof.

As stated above, the actuator control system 132 includes an event detection system having one or more sensors that are capable of detecting a flow control event. These sensors may include pressure sensors 210, a rudder deflection sensor 212, a control input sensor 214, a flight parameter sensor 216, or any combination thereof. For illustration purposes only, FIG. 2 shows multiple rows of pressure sensors 210 configured according to various locations and installation densities. There are three rows of pressure sensors 210 shown on the vertical stabilizer 126. Some of these are shown to extend from the leading edge 218 of the vertical stabilizer 126 to the trailing edge 220 of the vertical stabilizer 126. One row of pressure sensors 210 is shown to extend from the leading edge 218 to a location approximately mid-chord of the vertical stabilizer 126. Other pressure sensors 210 are shown to be more densely placed linearly from the leading edge of the rudder 128 to the trailing edge 224 of the rudder 128.

It should be understood that in order to increase the accuracy of the representation of the flow field flowing over the vertical control surface 122, the number of pressure sensors 210 should be increased. FIG. 2 shows several examples of configurations for the pressure sensors 210 to illustrate the concept that the pressure sensors may be linearly aligned at any spanwise location(s) on the vertical stabilizer 126 and/or on the rudder 128 and utilizing any number of sensors. However, in practice, only a minimal number of pressure ports may be utilized to provide an estimation of the flow characteristics while minimizing the cost and maintenance associated with the pressure sensors 210. According to one embodiment, the rows of pressure sensors 210 may be linearly placed along or near the boundaries of the zones, such as between the root zone 202 and the middle zone 204, and between the middle zone 204 and the tip zone 206.

Another sensor that may be used with the event detection system is the rudder deflection sensor 212. The rudder deflection sensor 212 is linked to the rudder 128 and is capable of sensing the deflection angle corresponding to the deflection of the rudder 128. As the deflection angle increases, the potential for flow separation over the vertical control surface 122 also increases. Utilizing the active flow control actuators 134 when the rudder 128 is deflected beyond a threshold deflection angle may be beneficial to prevent or delay flow separation. Accordingly, the rudder deflection sensor 212 may be used by the actuator control system 132 to monitor the deflection of the rudder 128 and to activate the appropriate active flow control actuators 134 when appropriate.

A control input sensor 214 may include any number and type of sensors that may be used to detect a control input from a pilot or autopilot to the flight control system of the aircraft. For example, the control input sensor 214 may include a sensor that detects a change in an engine thrust setting and/or a rudder pedal deflection. These control inputs are used by the actuator control system 132 to determine whether actuation of the airflow over the vertical control surface 130 is appropriate given the input itself, as well as in combination with date from one or more pressure sensors 210 and or flight parameter sensor 216. A flight parameter sensor 216 may be any sensor that provides applicable current environmental and/or flight data to the actuator control system 132. For example, aircraft speed, altitude, attitude, sideslip data, climb or descent rates, and ambient pressure may all be factors utilized by the actuator control system 132 in determining whether to activate any active flow control actuators 134.

Figure 3:
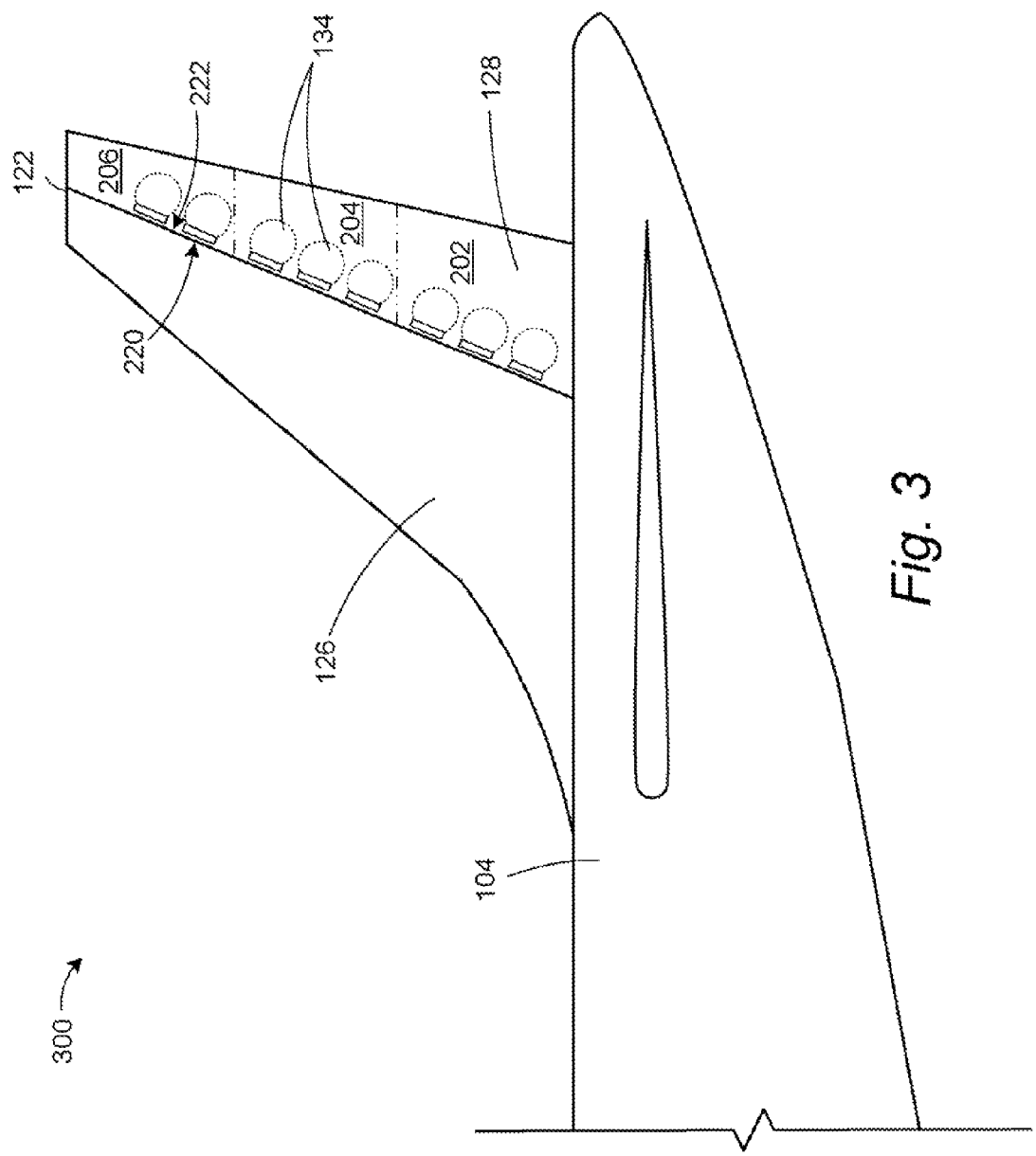
FIG. 3 is a side view of an enhanced flow control tail of an aircraft showing components of an active flow control system with active flow control actuators positioned at a leading edge of a rudder according to one embodiment presented herein.

Turning now to FIG. 3, an alternative embodiment is shown in which an enhanced flow control tail 300 has the active flow control actuators 134 mounted within the rudder 128 rather than within the vertical stabilizer 126. In doing so, the actuating flow from the active flow control actuators 134 interacts with the ambient flow on the rudder itself, proximate to the leading edge 222 of the rudder. Because flow separation commonly occurs on the rudder aft of the leading edge 222, placement of the active flow control actuators 134 within the rudder 128 may be advantageous. However, depending on the particular implementation, structural limitations within the rudder 126 may influence the positioning of the active flow control actuators 134 within the vertical stabilizer 126 so that the actuating flow from the actuators interacts with the ambient flow close to the trailing edge 220 of the stabilizer to maximize the effect on the flow separation over the rudder 128.

Figure 4:
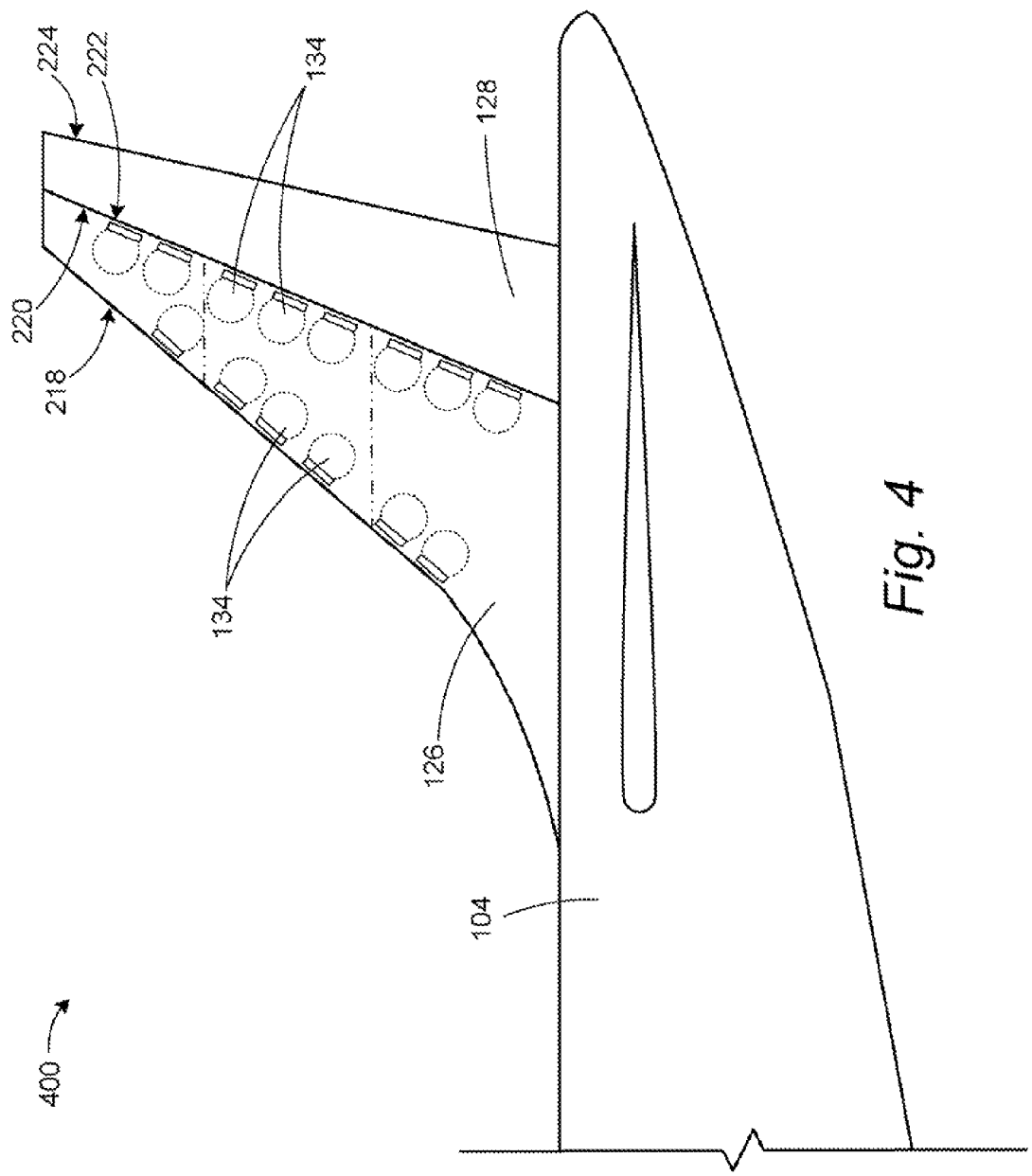
FIG. 4 is a side view of an enhanced flow control tail of an aircraft showing components of an active flow control system with active flow control actuators positioned at a leading edge and a trailing edge of a vertical stabilizer according to one embodiment presented herein.
Figure 5:
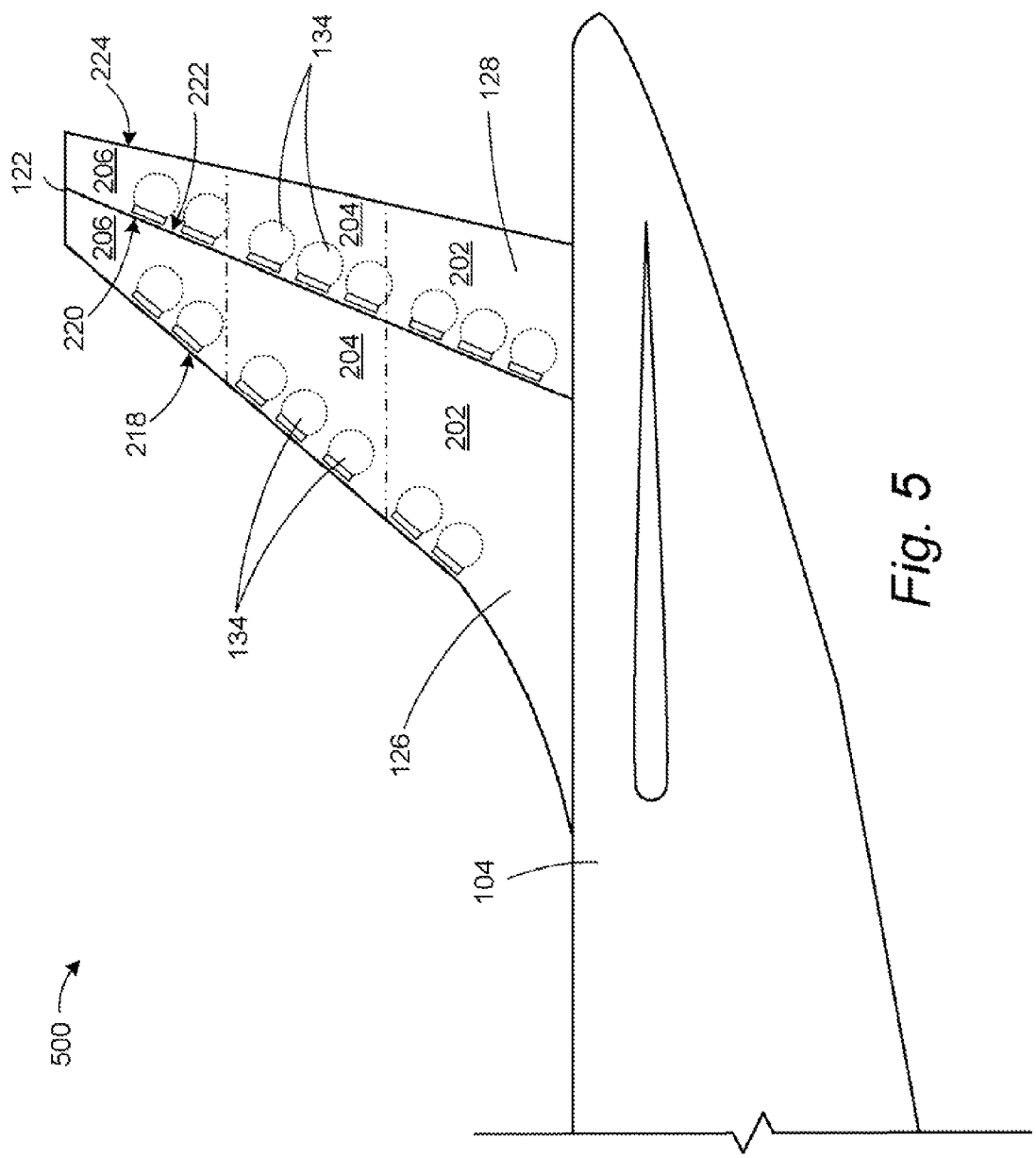
FIG. 5 is a side view of an enhanced flow control tail of an aircraft showing components of an active flow control system with active flow control actuators positioned at a leading edge of a vertical stabilizer and a leading edge of a rudder according to one embodiment presented herein.

A further embodiment is shown in FIG. 4, with an enhanced flow control tail 400 that includes two groupings of linearly aligned active flow control actuators 134. The first is mounted within the vertical stabilizer 126 near the leading edge 218. The second is mounted within the vertical stabilizer 126 near the trailing edge 220. Yet another embodiment is shown in FIG. 5, with an enhanced flow control tail 500 that again includes two groupings of linearly aligned active flow control actuators 134. However, according to this embodiment, the first grouping of active flow control actuators 134 is mounted within the vertical stabilizer 126 near the leading edge 218, while the second grouping of active flow control actuators 134 is mounted within the rudder 128 near the leading edge 222. It should be appreciated that alternative embodiments could include third or fourth groupings of active flow control actuators 134 positioned at the trailing edge 220 of the vertical stabilizer 126 and/or at the trailing edge 224 of the rudder 128.

By having multiple groupings of active flow control actuators 134, additional control over the ambient airflow may be maintained. For example, by actuating the airflow near the trailing edge 220 of the vertical stabilizer 126, the airflow at the leading edge 218 of the vertical stabilizer 126 may be disrupted in a manner that would benefit from flow actuation at the leading edge 218. From the description of the enhanced flow control tails 200, 300, and 400, it should be clear that the disclosure herein contemplates any number, placement, and zone configurations of active flow control actuators 134.

Figure 6:
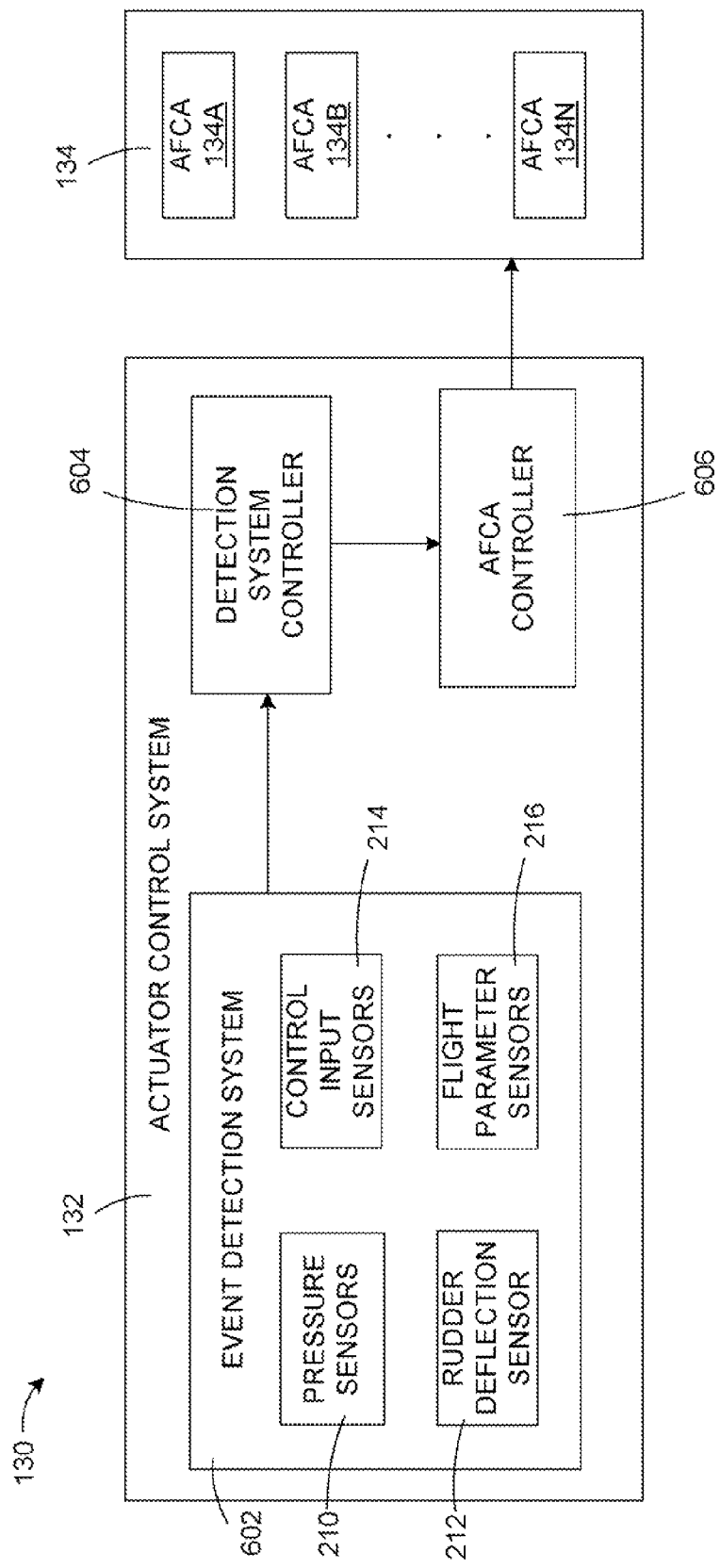
FIG. 6 is a block diagram showing components of an active flow control system according to various embodiments presented herein.

Referring now to FIG. 6, the active flow control system 130 will be described in greater detail. As discussed above, the active flow control system 130 includes an actuator control system 132 and a number of active flow control actuators 134. The actuator control system 132 includes an event detection system 602 for collection of data corresponding to flow control events, a detection system controller 604 for interpretation of the data from the sensors of the event detection system 602 to determine that a flow control event has occurred, and an active flow control actuator (AFCA) controller 606 for identifying the active flow control actuators 134 for activation in response to the determination that the flow control event occurred, and to activate the appropriate active flow control actuators 134.

As described above, the event detection system 602 may include any number and type of sensors, including but not limited to the pressure sensors 210, the rudder deflection sensor 212, the control input sensors 214, and the flight parameter sensors 216. The event detection system 602 transmits the sensor data to the detection system controller 604, which makes a determination as to whether a flow control event has occurred. This determination and all appropriate data, such as the type of event, the location of the event, and the severity of the event, is forwarded to the AFCA controller 606. The AFCA controller 606 utilizes this flow control event data to select the appropriate active flow control actuators 134, either all of the available active flow control actuators 134 or a subset of active flow control actuators 134 with a determined zone, and to activate those actuators. It should be appreciated that the detection system controller 604 and the AFCA controller 606 may be separate controllers or may be a single controller operative to perform the functionality of both controllers. Each controller may be computer hardware and/or software programmed to perform the operations described herein.

Figure 7:
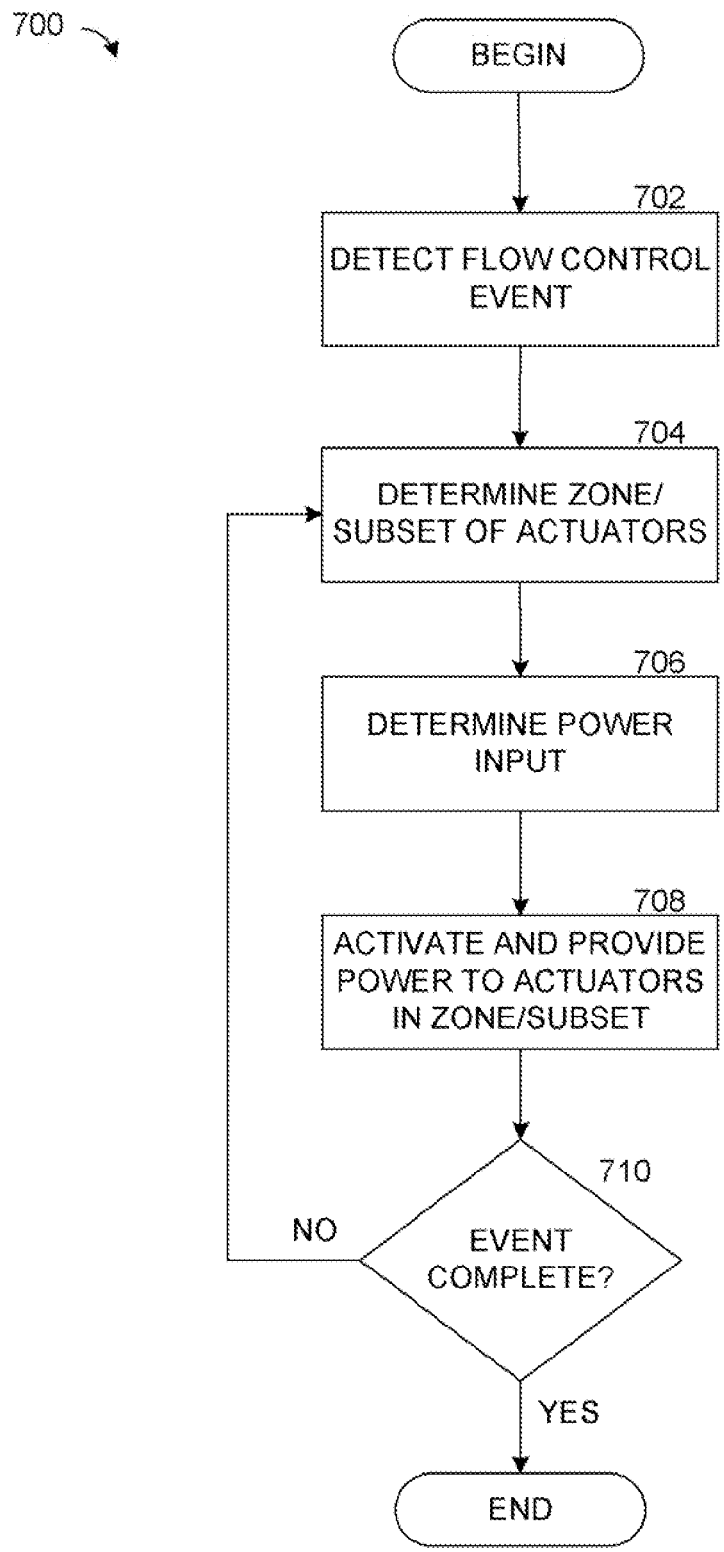
FIG. 7 is a flow diagram illustrating a method for controlling an airflow over a vertical control surface according to various embodiments presented herein.

Turning to FIG. 7, an illustrative routine 600 for providing actuating airflow over a vertical control surface 122 will now be described in detail. It should be appreciated that more or fewer operations may be performed than shown in FIG. 7 and described herein. Moreover, these operations may also be performed in a different order than those described herein. The routine 600 begins at operation 702, where a flow control event is detected. The flow control event may be a flow separation indicator or any other data collected from one or more sensors of the event detection system 602. This determination that a flow control event has occurred may be made by the detection system controller 604 or the AFCA controller 606.

From operation 702, the routine 600 continues to operation 704, where the AFCA controller 606 determines according to the flow control event data which active flow control actuators 134 or zone of active flow control actuators 134 are to be activated to control the airflow over the vertical control surface 122. The routine 600 continues to operation 706, where the AFCA controller 606 determines the power input levels for activating the selected active flow control actuators 134. As described above, according to various embodiments, the active flow control actuators 134 may be operated at less than full power to conserve aircraft power. This determination may depend on the magnitude of the flow control event, the location of the event, and the number and positioning of the available active flow control actuators 134.

At operation 708, the AFCA controller 606 activates the selected active flow control actuators 134 according to the determined zones and power levels. From operation 708, the routine 600 continues to operation 710, where a determination is made as to whether the flow control event has completed. If the event is no longer applicable, such as when the conditions causing flow separation have concluded, then the routine 600 ends. However, if at operation 710, a determination is made that the flow control event has not concluded, then the routine 600 returns to operation 704 and continues as described above.

It should be clear from the disclosure above that the technologies described herein provide for enhanced control of airflow over a vertical control surface 122 of an aircraft. Upon encountering situations in which the forces required to be produced by the aircraft vertical control surface 122 in order to maintain control of the aircraft at the outer boundaries of the designed flight envelope cannot be produced without flow actuation, the appropriate flow actuation techniques described above are employed. In using these techniques, the size of the vertical control surface 122 of an aircraft can be significantly reduced as compared to the vertical control surface 102 of a conventional aircraft.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An active flow control system for controlling an airflow over a vertical control surface of an aircraft, comprising:
   the vertical control surface comprising a vertical stabilizer, a rudder, and a rudder hinge line between a trailing edge of the vertical stabilizer and a leading edge of the rudder;
   a plurality of active flow control actuators positioned within the rudder proximate to and parallel with the rudder hinge line, and within the vertical stabilizer proximate to and parallel with a leading edge of the vertical stabilizer, each active flow control actuator comprising an air cavity fluidly engaging the vertical control surface and operative to provide an actuating airflow from the air cavity out of the vertical control surface into the airflow that alters a flow characteristic of the airflow over the vertical control surface when activated; and
   an actuator control system communicatively linked to the plurality of active flow control actuators, the actuator control system operative to detect a flow control event, to dynamically define a subset of active flow control actuators corresponding to the flow control event, and to activate the subset of active flow control actuators to alter the flow characteristic of the airflow.

2. The system of claim 1, wherein the at least one active flow control actuator comprises a synthetic jet actuator, a sweep jet actuator, a flipperon, or an active vortex generator.

3. The system of claim 1, wherein the plurality of active flow control actuators are positioned within a plurality of zones of the vertical control surface, and wherein the actuator control system is further operative to define and activate the subset of active flow control actuators according to zone membership.

4. The system of claim 1, wherein the plurality of active flow control actuators are sequentially vertically arranged from a root of the vertical control surface abutting an aircraft fuselage to a tip of the vertical control surface opposite the root.

5. The system of claim 1, wherein the flow control event comprises a flow separation indicator.

6. The system of claim 1, wherein the flow control event comprises a flow separation indicator, and wherein the actuator control system comprises at least one pressure sensor positioned on the vertical stabilizer or the rudder such that the at least one pressure sensor is operative to detect the flow separation indicator corresponding to the vertical stabilizer or rudder.

7. The system of claim 1, wherein the actuator control system comprises at least one rudder deflection sensor operative to detect a rudder deflection angle, and wherein the flow control event comprises at least a threshold rudder deflection angle.

8. The system of claim 1, wherein the flow control event comprises one or more control inputs to a flight control system of the aircraft.

9. The system of claim 1, wherein a second plurality of active flow control actuators are positioned linearly on or within the vertical stabilizer adjacent to the leading edge of the rudder.

10. The system of claim 1, wherein the plurality of active flow control actuators are positioned linearly on or within the rudder adjacent to the leading edge of the rudder.

11. The system of claim 1, wherein the plurality of active flow control actuators comprises a first plurality of active flow control actuators and a second plurality of active flow control actuators, and wherein the first plurality of active flow control actuators are positioned linearly on or within the vertical stabilizer adjacent to the leading edge of the vertical stabilizer and the second plurality of active flow control actuators are positioned linearly adjacent to the leading edge of the rudder.

12. A method of controlling an airflow over a vertical control surface of an aircraft, the method comprising:
   detecting a flow control event associated with the vertical control surface;
   in response to detecting the flow control event, determining a subset of a plurality of active flow control actuators associated with the vertical control surface for activation, the plurality of active flow control actuators positioned within a rudder proximate to and parallel with a rudder hinge line, and within a vertical stabilizer proximate to and parallel with a leading edge of the vertical stabilizer;
   determining a reduced power input according to a desired actuating airflow output that is less than a maximum actuating airflow output for one or more active flow control actuators of the subset;
   providing the reduced power input to the one or more active flow control actuators; and
   expelling an actuating airflow from within the vertical control surface from each active flow control actuator of the subset according to the reduced power input such that actuating airflow alters the airflow over the vertical control surface.

13. The method of claim 12, wherein expelling the actuating airflow comprises expelling the actuating airflow from the subset of the plurality of active flow control actuators positioned within a plurality of zones of the vertical control surface, the subset of the plurality of active flow control actuators corresponding to a zone associated with the flow control event.

14. The method of claim 12, wherein detecting the flow control event comprises detecting a rudder deflection angle greater than a predetermined threshold angle, detecting a pressure gradient associated with the airflow indicative of an impending or current flow separation, detecting a control input to a flight control system of the aircraft, or detecting a flow control flight parameter.

15. The method of claim 12, wherein the vertical control surface comprises the vertical stabilizer and the rudder, wherein detecting the flow control event comprises detecting with a plurality of pressure sensors a pressure gradient associated with the airflow indicative of an impending or current flow separation, and wherein the subset comprises a second plurality of active flow control actuators positioned within the vertical stabilizer proximate to and parallel with a trailing edge of the vertical stabilizer adjacent to a leading edge of the rudder such that the actuating airflow is expelled by the second plurality of active flow control actuators into the airflow over the leading edge of the rudder.

16. An active flow control system for controlling an airflow over a vertical control surface of an aircraft, comprising:

the vertical control surface having a plurality of zones;

a plurality of active flow control actuators mounted within a rudder proximate to and parallel with a rudder hinge line, and within a vertical stabilizer proximate to and parallel with a leading edge of the vertical stabilizer according to the plurality of zones, each active flow control actuator comprising a piezoelectric disk operative to produce an actuating flow that alters a flow characteristic of the airflow over the vertical control surface when the piezoelectric disk is activated and the actuating flow is expelled from the active flow control actuator; and an actuator control system communicatively linked to the plurality of active flow control actuators, the actuator control system comprising a plurality of sensors operative to collect data associated with a flow control event, and a controller operative to utilize the data to detect the flow control event, to identify a subset of the plurality of active flow control actuators corresponding to a zone for controlling the airflow in response to the flow control event, and to activate the subset of the plurality of active flow control actuators.

17. The system of claim 16, wherein the plurality of sensors comprises a plurality of pressure sensors, wherein the controller being operative to utilize the data to detect the flow control event comprises the controller being operative to utilize pressure sensor data to detect a pressure gradient associated with the airflow indicative of an impending or current flow separation, and wherein the controller is further operative to identify a power input level associated with the subset of the plurality of active flow control actuators such that activating the subset of the plurality of active flow control actuators comprises providing the identified power input level to each of the active flow control actuators of the subset.

* * * * *